(12) United States Patent
Gyarmati et al.

(10) Patent No.: US 11,548,367 B2
(45) Date of Patent: Jan. 10, 2023

(54) HYBRID DRIVE UNIT AND DRIVE TRAIN FOR A MOTOR VEHICLE

(71) Applicant: ZF Friedrichshafen AG, Friedrichshafen (DE)

(72) Inventors: Tamas Gyarmati, Bermatingen (DE); Leschek Debernitz, Eriskirch (DE); Thorsten Müller, Friedrichshafen (DE); Stephan Stroph, Tettnang (DE); Alexander Gutsche, Horgenzell (DE); Peter Reinders, Markdorf (DE); Thomas Ratzmann, Meckenbeuren (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 208 days.

(21) Appl. No.: 16/999,590

(22) Filed: Aug. 21, 2020

(65) Prior Publication Data
US 2021/0053433 A1 Feb. 25, 2021

(30) Foreign Application Priority Data

Aug. 23, 2019 (DE) ...................... 10 2019 212 670.7

(51) Int. Cl.
*B60K 6/405* (2007.10)
*B60K 6/26* (2007.10)
(Continued)

(52) U.S. Cl.
CPC ............. *B60K 6/405* (2013.01); *B60K 6/26* (2013.01); *B60K 6/36* (2013.01); *B60K 6/38* (2013.01); *F16H 57/02* (2013.01); *F16H 57/0423* (2013.01); *F16H 57/0436* (2013.01); *F16H 57/0476* (2013.01); *H02K 7/006* (2013.01); *H02K 7/10* (2013.01); *H02K 9/19* (2013.01);
(Continued)

(58) Field of Classification Search
None
See application file for complete search history.

(56) References Cited

U.S. PATENT DOCUMENTS 9,261,017 B2 * 2/2016 Iwase ...................... F16D 48/02
9,878,706 B2 * 1/2018 Frait ..................... B60K 6/405
(Continued)

FOREIGN PATENT DOCUMENTS

DE    102014118485 A1    6/2015
DE    102018119186 A1    2/2019

*Primary Examiner* — Dirk Wright
(74) *Attorney, Agent, or Firm* — Dority & Manning, P.A.

(57) ABSTRACT

A hybrid drive unit (HY, G) for a motor vehicle includes a housing (GG), in which a torque converter (TC) and an electric machine (EM) are accommodated. The electric machine (EM) and the torque converter (TC) are arranged directly next to each other such that the electric machine (EM) is arranged at a first face end (TC1) of the torque converter housing (TCG). An oil guide shell (LS) at least partially encompasses a section of the torque converter (TC). The oil guide shell (LS) has an L-shaped cross-section including a first section (LS1) and a second section (LS2) and is arranged in such that the first section (LS1) partially encompasses a second face end (TC2) of the torque converter housing (TCG) and the second section (LS2) partially encompasses a circumferential surface of the torque converter housing (TCG).

16 Claims, 9 Drawing Sheets

(51) Int. Cl.
*B60K 6/36* (2007.10)
*B60K 6/38* (2007.10)
*F16H 57/04* (2010.01)
*F16H 57/02* (2012.01)
*H02K 7/00* (2006.01)
*H02K 7/10* (2006.01)
*H02K 9/19* (2006.01)

(52) U.S. Cl.
CPC . *B60Y 2200/92* (2013.01); *F16H 2057/02043* (2013.01)

(56) References Cited

U.S. PATENT DOCUMENTS

| | | | |
|---|---|---|---|
| 10,385,960 B2 * | 8/2019 | Zhang | F16H 57/0453 |
| 10,723,216 B2 * | 7/2020 | Nelson | B60K 6/48 |
| 10,731,741 B2 * | 8/2020 | Frait | B60K 6/48 |

* cited by examiner

HYBRID DRIVE UNIT AND DRIVE TRAIN FOR A MOTOR VEHICLE

CROSS-REFERENCE TO RELATED APPLICATION

The present application is related and has right of priority to German Patent Application No. 10 2019 212 670.7 filed on Aug. 23, 2019, which is incorporated by reference in its entirety for all purposes.

FIELD OF THE INVENTION

The invention relates generally to a hybrid drive unit for a motor vehicle, and to a drive train for a motor vehicle including such a hybrid drive unit.

BACKGROUND

A hybrid drive unit can be an integral part of a transmission, which is configured for forming different ratios between an internal combustion engine and driving wheels of the motor vehicle. Alternatively, the hybrid drive unit can be designed as a separate component, which is arranged in the drive train between the internal combustion engine and the transmission. A component of this type is also referred to as a hybrid module.

Patent application DE 10 2014 118 485 A1 describes, for example, an arrangement for a hybrid drive unit of this type. The arrangement includes a front module with an electric machine and a release clutch, a transmission behind the front module, a torque converter between the front module and the transmission, and a guide device radially between the torque converter and the transmission. The guide device subdivides a cavity, which extends between the transmission housing and the housing of the torque converter, between a dry side and a wet side. The guide device forms a bathtub-like shape. Oil entering the dry side is to be pumped out of the guide device via the rotation of the torque converter.

Such a design is considered to be disadvantageous, since a passive outflow of oil out of the "dry" side is not possible. As a result, an operating behavior of the drive train can be limited, particularly when oil is very cold.

Patent application DE 10 2018 119 186 A1 describes a transmission assembly including a housing, an electric motor, a torque converter, and a baffle plate. The baffle plate is arranged under the electric machine and is adjacent to the torque converter. With the aid of the baffle plate, a contact of oil with the torque converter is to be minimized.

An approach of this type does not prevent oil from coming into contact with the torque converter, however, in a downhill position or during a strong braking procedure of the motor vehicle including a transmission assembly of this type. Due to the baffle plate, the outflow of oil after an operating condition of this type can even be retarded.

SUMMARY OF THE INVENTION

Example aspects of the invention therefore make a design available, which allows for a passive outflow of oil out of the area of the torque converter.

As an example solution to the problem, a hybrid drive unit including a housing is provided. The housing can be designed as one piece or multiple pieces and accommodates at least a torque converter and an electric machine. The electric machine and the torque converter are arranged directly next to each other, so that the electric machine is arranged at a first face end of the torque converter. A rotor of the electric machine is connected to a housing of the torque converter, so that the rotor and the torque converter housing have a common rotational speed. Moreover, an oil guide shell is provided, which at least partially encompasses a section of the torque converter.

According to example aspects of the invention, it is now provided that the oil guide shell has an L-shaped cross-section, wherein the two parts of the L shape are formed by a first section and a second section. In contrast to the guide device described in DE 10 2014 118 485 A1, which has a U-shaped cross-section, the oil guide shell therefore does not form a "bathtub-like" shape. The two sections of the L shape are arranged in such a way that the first section encompasses a second face end of the torque converter in sections or partially and the second section encompasses a circumferential surface of the torque converter in sections or partially.

Due to the L-shaped cross-section and the arrangement of the oil guide shell according to example aspects of the invention, a passive outflow of oil starting from an inner surface of the oil guide shell in the direction of the first face end of the torque converter is made possible. The inner surface of the oil guide shell is the surface that is aligned toward the housing of the torque converter.

Preferably, the oil guide shell is arranged in such a way that the second section encompasses a circumferential surface of the electric machine in sections or partially, in particular the stator of the electric machine in the design of the electric machine as an internal rotor. Due to this "extension" of the second section of the oil guide shell in the direction of the electric machine, oil can also be kept away from the torque converter, in an easy way, for the case in which the motor vehicle including the hybrid drive unit is in a downhill position.

According to one preferred example embodiment, the electric machine can be cooled via the supply of cooling oil. In this case, the oil guide shell is designed and arranged in such a way that at least a portion of the cooling oil flowing off the electric machine is collected at the inner surface of the oil guide shell. As a result, the time period during which the oil is in contact with the electric machine is extended in an easy way, so that the cooling of the electric machine is improved. Due to the passive outflow of the oil in the direction of the first face end of the torque converter, an accumulation of heated cooling oil is avoided in an easy way.

Preferably, the oil guide shell encompasses only a portion of the axial extension of the electric machine, so that cooling oil flowing off the electric machine is only partly collected at the inner surface of the oil guide shell. Due to such an approach, an effective compromise can be achieved between an efficient cooling of the electric machine and a reduction of the amount of oil in the area of the torque converter housing.

Preferably, the oil guide shell and the housing of the hybrid drive unit are designed and arranged in such a way that the portion of the cooling oil flowing off the electric machine that is not collected at the inner surface of the oil guide shell is guided spatially underneath the oil guide shell to an oil sump of the hybrid drive unit.

According to one preferred example embodiment, a gap is formed between the inner surface of the oil guide shell and the housing of the torque converter. The oil guide shell is arranged in such a way that cooling oil collected at the inner surface of the oil guide shell can flow into the gap. Due to the defined gap, a targeted guidance of the oil between the inner surface of the oil guide shell and the torque converter housing is made possible.

Preferably, a means is provided for carrying away cooling oil present in the gap, for example, a scraper edge formed at the oil guide shell, a scraper edge formed or attached at the housing of the hybrid drive unit, or a drainage duct to the oil sump of the hybrid drive unit. With the aid of the scraper edge, oil present in the gap can be moved out of the gap due to the turning motion of the torque converter housing. The drainage duct, on the other hand, allows for a passive outflow of the oil.

Preferably, the oil guide shell is rotationally fixed to the housing. As a result, a defined position of the oil guide shell can be ensured.

According to one preferred example embodiment, the oil guide shell includes a cover element, which covers a drive element of an oil pump of the hybrid drive unit, at least in sections or partially. Due to such a cover element, the amount of oil that comes in contact with the drive element can be reduced. As a result, the hydraulic drag of the transmission can be further reduced.

According to one preferred example embodiment, the oil guide shell is arranged in such a way that, in a horizontally aligned installation position of the hybrid drive unit, a spatially lowermost point of the oil guide shell is situated spatially underneath an oil level of the hybrid drive unit. A horizontally aligned installation position is understood to be a condition in which the hybrid drive unit is not slanted with respect to an installation position of the hybrid drive unit in the motor vehicle and, in fact, neither toward the side nor toward the front or the rear. In the horizontally aligned installation position, the hybrid drive unit therefore assumes a position that corresponds to an installation position in the motor vehicle, which is located on a flat surface. In an arrangement of this type as well, the oil guide shell can contribute to the reduction of the hydraulic drag, since, due to the rotational speed of the torque converter housing, more oil is moved out of the inner surface of the oil guide shell than subsequently flows starting from the oil sump or from the electric machine.

The hybrid drive unit can be an integral part of a motor vehicle drive train.

BRIEF DESCRIPTION OF THE DRAWINGS

Exemplary embodiments of the invention are described in detail in the following. Wherein.

DETAILED DESCRIPTION

Figure 1:
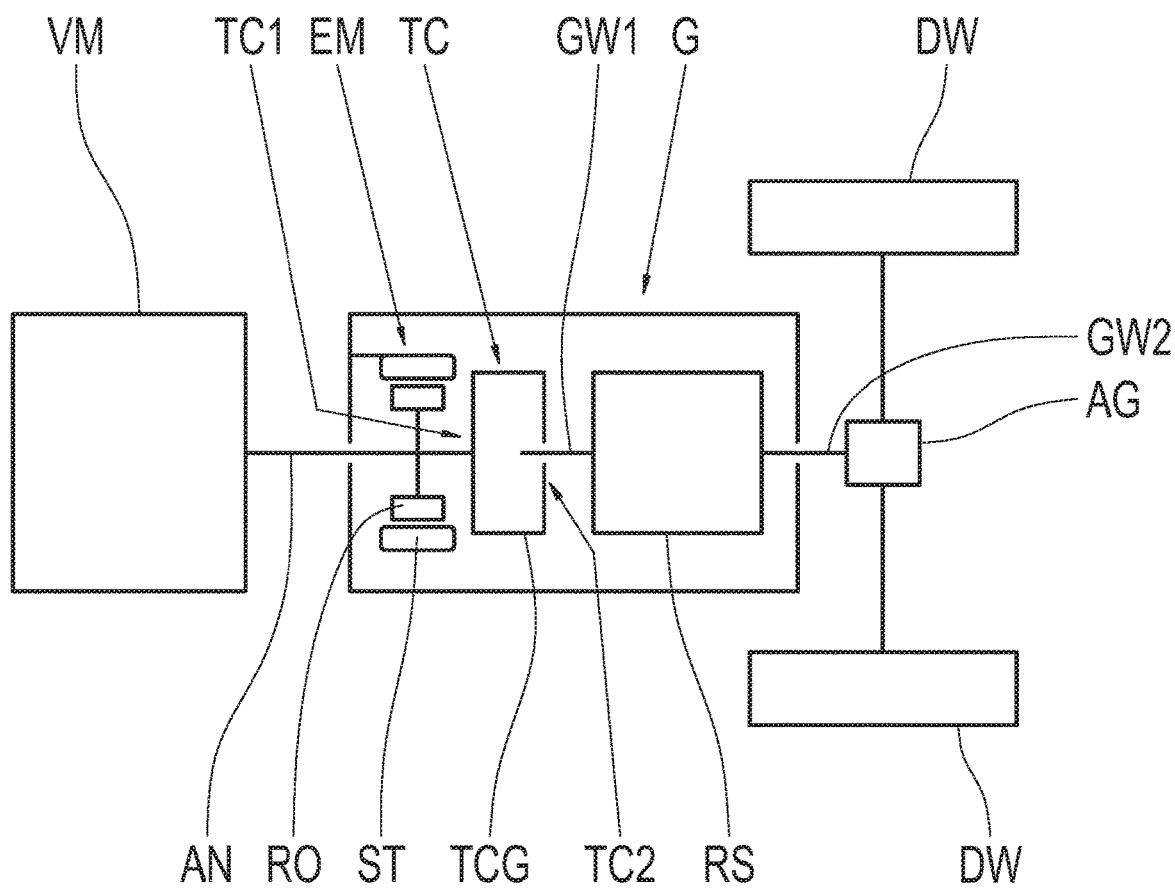
FIG. 1 and FIG. 2 each show a diagrammatic view of an example motor vehicle drive train.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 diagrammatically shows a drive train for a motor vehicle. The drive train includes an internal combustion engine VM, the output of which is connected to a connection shaft AN of a transmission G. The transmission G forms a hybrid drive train unit of the drive train, and includes an electric machine EM with a rotationally fixed stator ST and a rotary rotor RO. The rotor RO is connected to the connection shaft AN and to the housing TCG of a torque converter TC. On the output end, the torque converter TC is connected to an input shaft GW1 of a transmission gear set RS. An output shaft GW2 of the transmission gear set RS is connected to driving wheels DW of the motor vehicle via a differential gear AG. The housing TCG of the torque converter includes a first face end TC1 and a second face end TC2. The electric machine EM and the torque converter TC are arranged directly next to one another, so that the electric machine EM is arranged directly at the first face end TC1 of the torque converter housing TCG.

Figure 2:
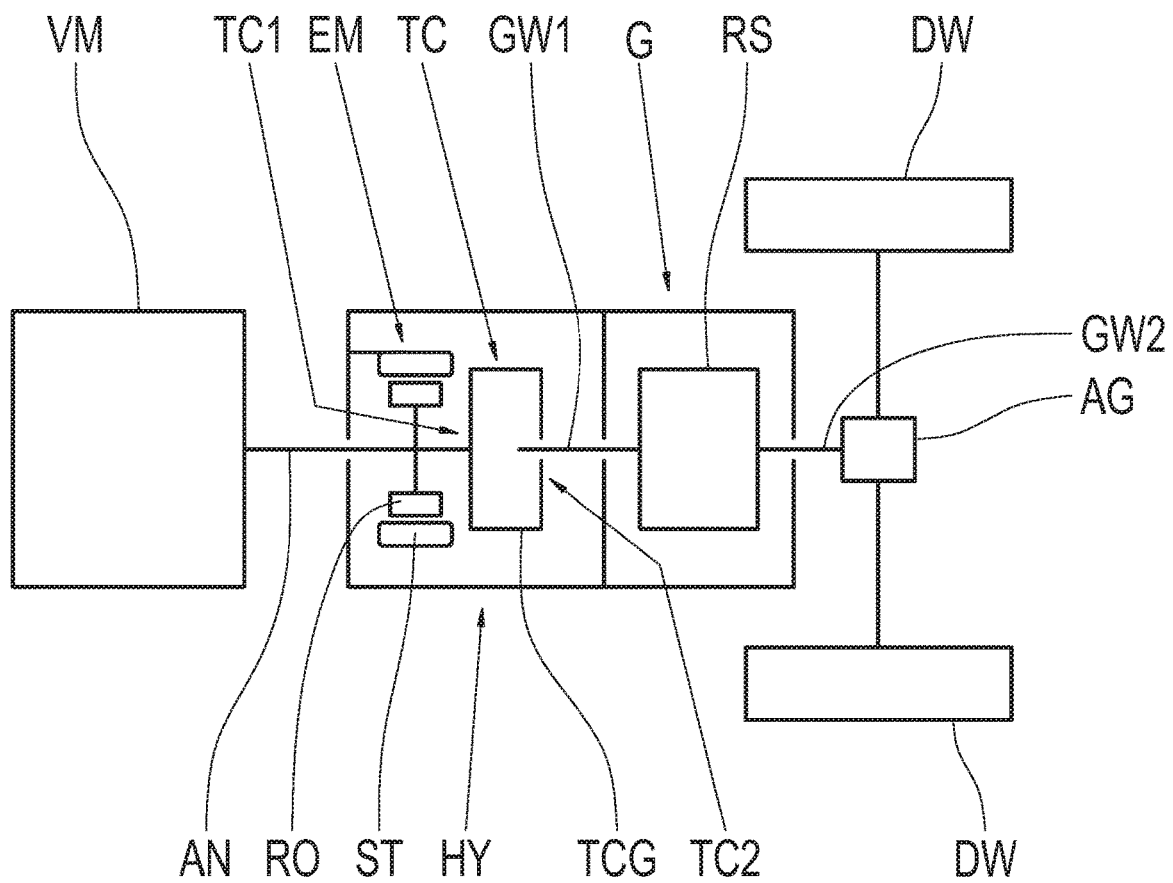

FIG. 2 diagrammatically shows a drive train, in which no electric machine is contained in the transmission G. Instead, a hybrid module HY is provided between the internal combustion engine VM and the transmission G. In this example embodiment, the hybrid module HY includes the electric machine EM, so that the hybrid module HY forms the hybrid drive unit of the drive train. In the exemplary embodiment represented in FIG. 2, the torque converter TC is also an integral part of the hybrid module HY. Alternatively, the torque converter TC may be an integral part of the transmission G.

Figure 3A:
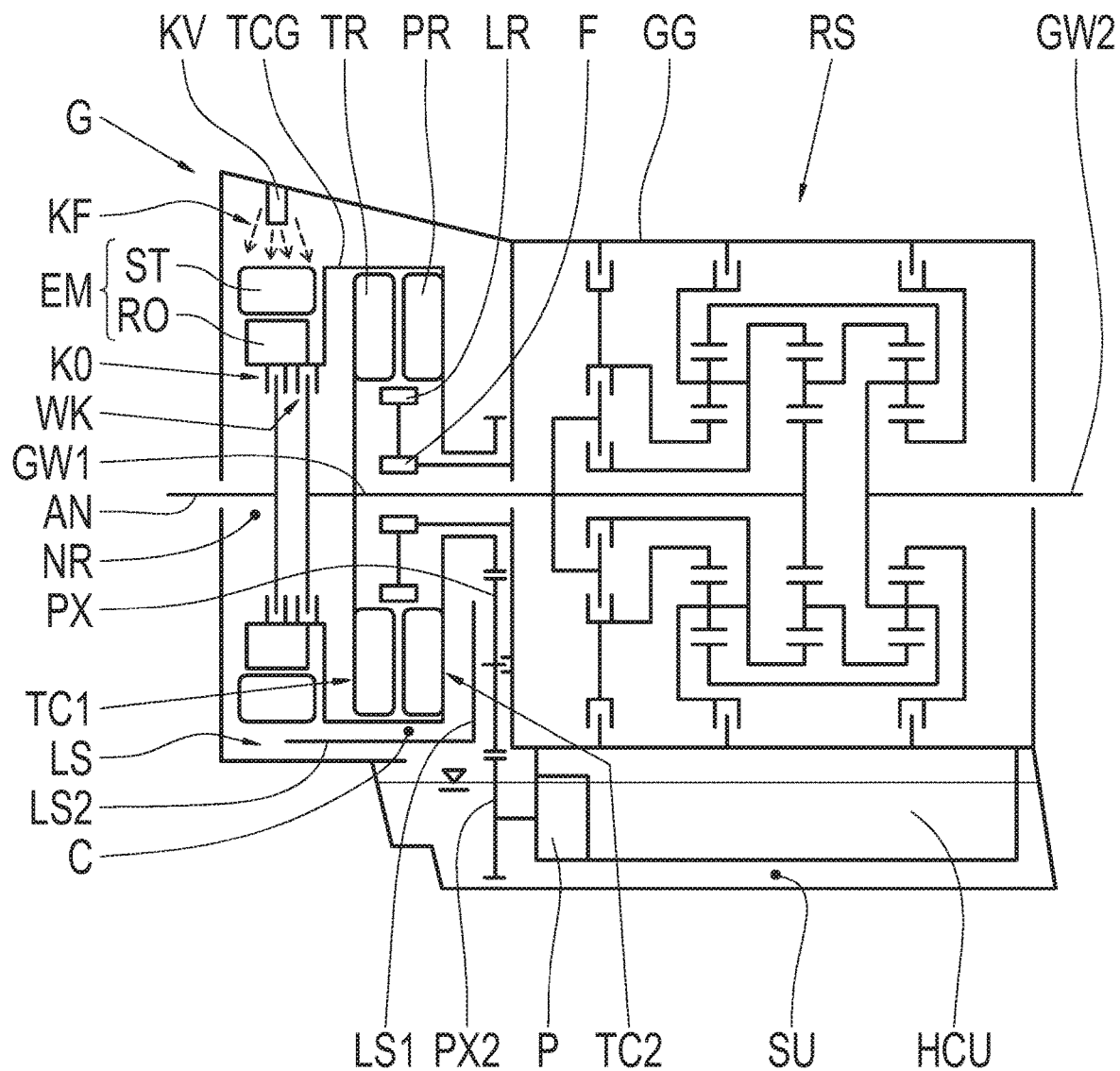
FIG. 3a through FIG. 5 each show a diagrammatic sectional view of an example hybrid drive unit of the example motor vehicle drive train.

FIG. 3a shows a diagrammatic sectional view of a hybrid drive unit of the motor vehicle drive train, in the represented exemplary embodiment as a transmission G including an electric machine EM. The transmission gear set RS has multiple planetary gear sets by way of example. Alternatively or additionally, the transmission gear set RS may be formed from multiple spur gear trains and/or from a flexible traction drive mechanism, for example, as a CVT transmission. The transmission gear set RS, together with the shift elements arranged therein, is configured for providing different transmission ratios between the input shaft GW1 and the output shaft GW2. The transmission gear set RS is enclosed by a housing GG. The housing GG can have multiple individual parts.

The transmission G includes a cavity NR on the input side. The torque converter TC as well as the electric machine EM are arranged in the cavity NR. The torque converter TC includes an impeller PR, a turbine wheel TR, and a stator LR, which cooperate hydrodynamically in a known way. The impeller PR is connected to the torque converter housing TCG. The connection shaft AN is connected to the rotor RO and to the impeller PR via an optional separating clutch KO. The input shaft GW1 is connected to the turbine wheel TR. The impeller PR and the turbine wheel TR are mechanically connectable to each other via a torque converter lockup clutch WK, so that, in the engaged condition of the torque converter lockup clutch WK, the torque converter TC is locked up. The stator LR is supported at the housing GG via a freewheel unit F. Further components, for example, one or multiple torsional vibration damper(s), may be arranged in the cavity NR.

Moreover, the transmission G includes an oil sump SU, an oil pump P, and a hydraulic control unit HCU. The oil level in the oil sump SU is indicated in FIG. 3a. The oil level varies, of course, depending on the temperature of the oil, the geometric position of the transmission G, and centrifugal forces acting on the oil. The transmission G can also include an oil reservoir (not represented in FIG. 3a). The oil pump P is configured for scavenging or drawing oil out of the oil sump SU and delivering the oil to the hydraulic control unit HCU. For this purpose, the pump P is driven via two gearwheels PX, PX2. The gearwheels PX, PX2 form drive elements of the oil pump P. The gearwheel PX is driven by a gearwheel, which is connected to the torque converter housing TCG. The gearwheel PX2 is connected to an input shaft of the oil pump P. The hydraulic control unit HCU is configured for feeding the oil delivered by the pump P to various hydraulic consumers of the transmission G, for example, to components of the gear set RS, to the torque converter TC, to the torque converter lockup clutch WK, and to the cooling of the electric machine EM. The oil delivered in such a way then flows back into the oil sump SU, so that a closed oil circuit is formed.

The cavity NR forms a wet space of the transmission G. In order to cool the electric machine EM, a cooling device KV is provided, which delivers cooling oil KF to the electric machine EM. The cooling oil KF flows down at the electric machine EM, so that thermal energy is transferred from the electric machine EM to the cooling oil KF.

In the wet space NR, an oil guide shell LS is provided, which is attached at the housing GG. The oil guide shell LS has an L-shaped cross-section, wherein the L shape is formed by a first section LS1 and a second section LS2. The first section LS1 extends along the second face end TC2 of the torque converter housing TCG. The second section LS2 encompasses a circumferential surface of the torque converter housing TCG and of the stator ST in sections or partially. The oil guide shell LS encompasses only a lower—in the installation position—area of the torque converter housing TCG and of the stator ST.

Cooling oil KF flowing down from the electric machine EM is partially collected at the inner surface of the oil guide shell LS. The inner surface of the oil guide shell LS is the surface that faces the torque converter housing TCG. The remaining cooling oil KF flows underneath the oil guide shell LS directly back into the oil sump SU.

A gap C is provided between the inner surface of the oil guide shell LS and the torque converter housing TCG. Since the torque converter housing TCG can have a high rotational speed, and the oil guide shell LS is rotationally fixed, oil in the gap C can result in a foaming-up of the oil and in increased hydraulic drag of the transmission G.

Figure 3B:
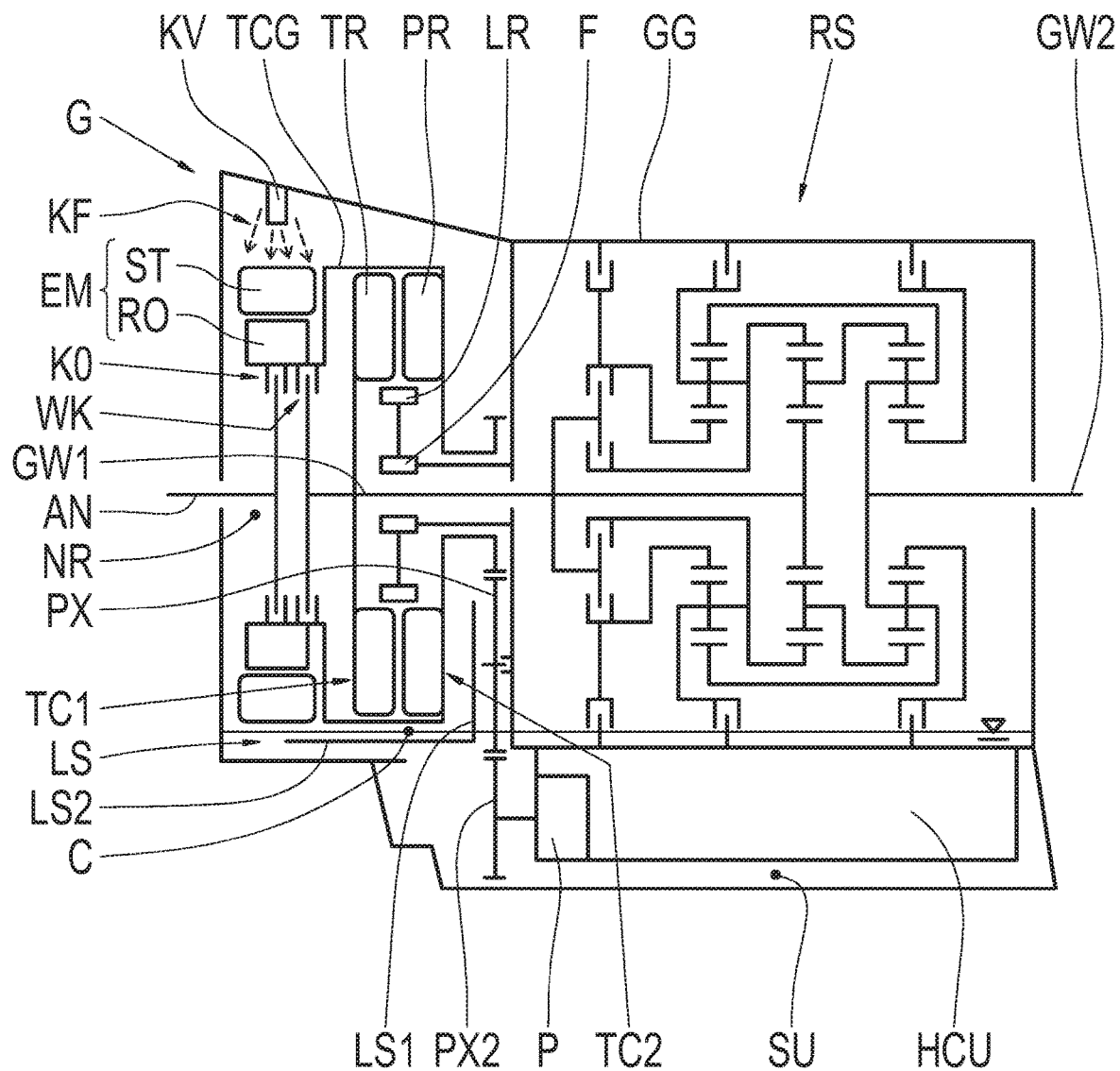

FIG. 3b shows a diagrammatic sectional view of a hybrid drive unit, which essentially corresponds to the representation according to FIG. 3a. Reference is made to the reference signs according to FIG. 3a. The only difference is the increased oil level, which, in the representation according to FIG. 3b, is arranged spatially above a lowermost point of the oil guide shell LS. Such a high oil level can be present in the hybrid drive unit, for example, at a high operating temperature of the oil and when the oil reservoir—if present—has been emptied. At an oil level of this type as well, the oil guide shell LS contributes to a reduction of the hydraulic drag, since, due to the rotational speed of the torque converter housing TCG, more oil is moved from the inner side of the oil guide shell LS than can subsequently flow starting from the oil sump SU or from the cooling oil KF flowing down at the electric machine EM.

Figure 4:
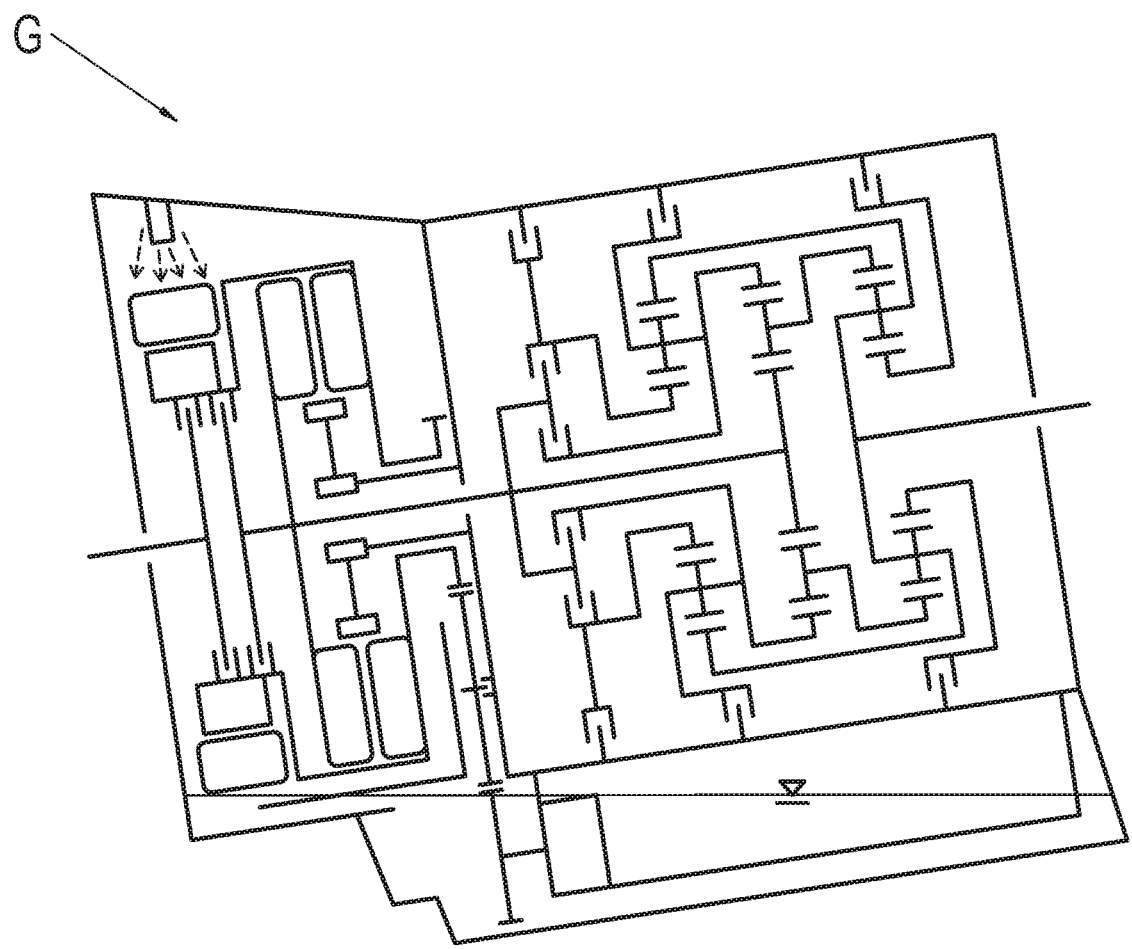

FIG. 4 shows the transmission G according to FIG. 3a or FIG. 3b in a downhill position of the motor vehicle. Reference is made to the reference signs according to FIG. 3a. In FIG. 4, the oil level is represented, which arises in the oil sump SU in the downhill position. In this position, an increased amount of oil can collect in the gap C.

Figure 5:
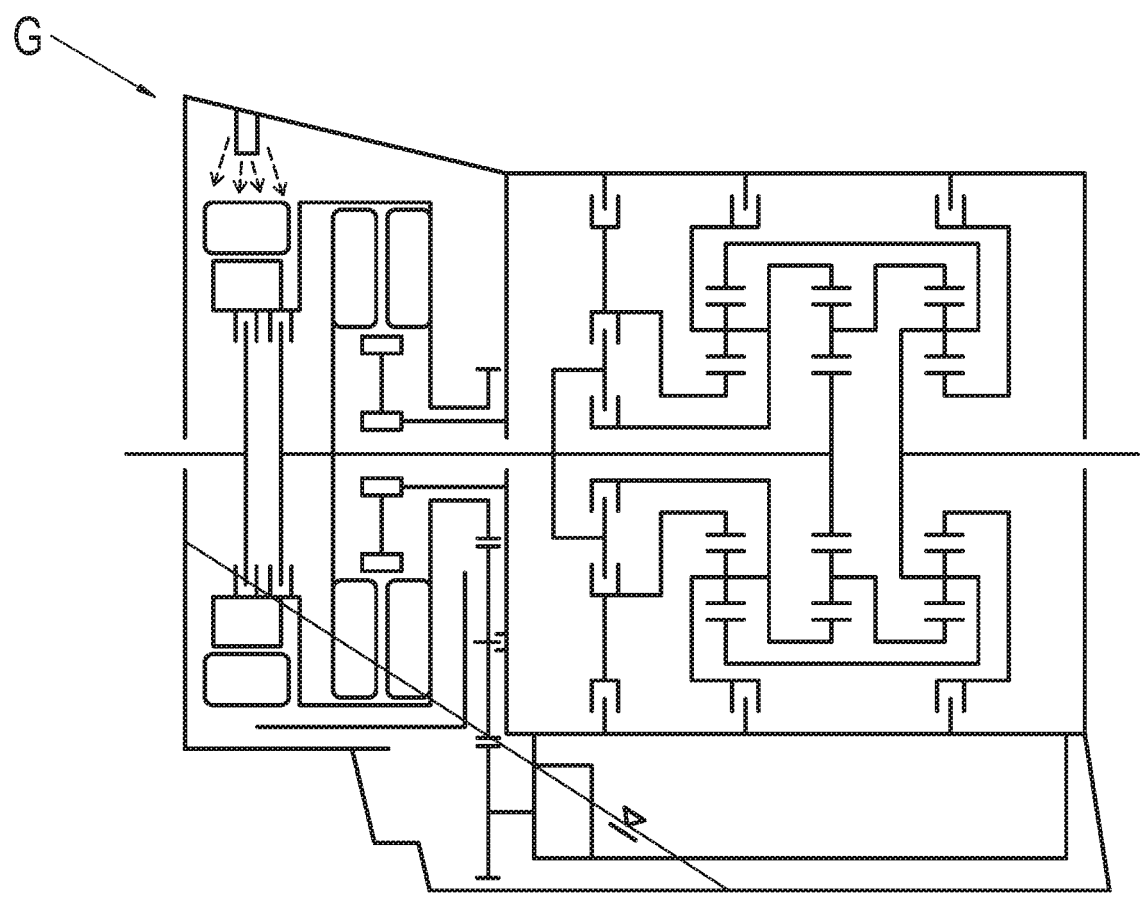

FIG. 5 shows the transmission G according to FIG. 3a or FIG. 3b during a strong deceleration of the motor vehicle. Reference is made to the reference signs according to FIG. 3a. In FIG. 5, the oil level is represented, which arises in the oil sump SU during the deceleration of the motor vehicle. In this position, an increased amount of oil can collect in the gap C.

Due to the L shape of the oil guide shell LS, the oil in the gap C can flow passively back into the oil sump SU as soon as the transmission G is in the horizontal position again or the deceleration of the vehicle has ended. In order to accelerate this process, structural means can be provided, which are described in the following.

Figure 6:
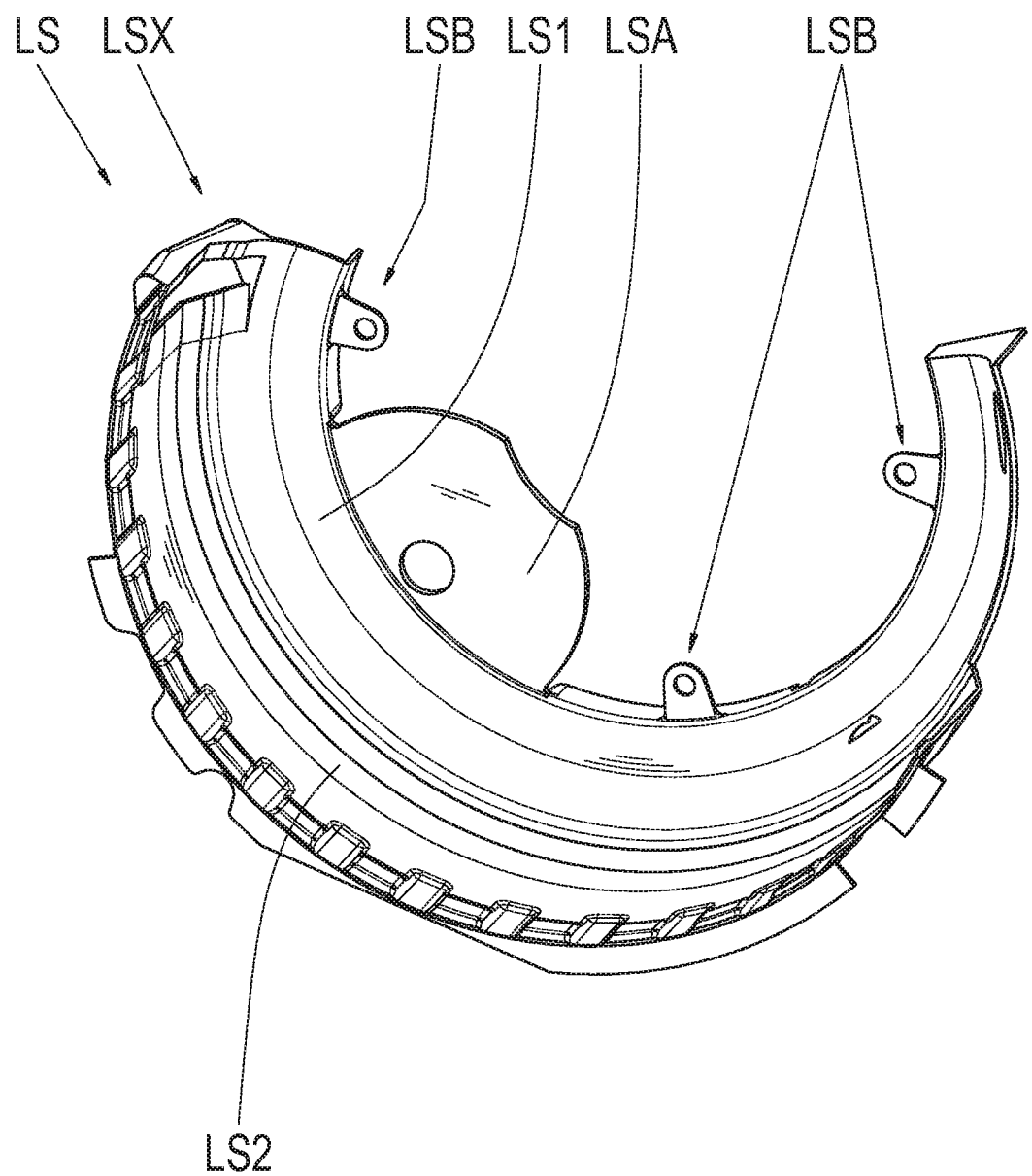
FIG. 6 through FIG. 8 show various views of an example oil guide shell of the example hybrid drive unit.
Figure 7:
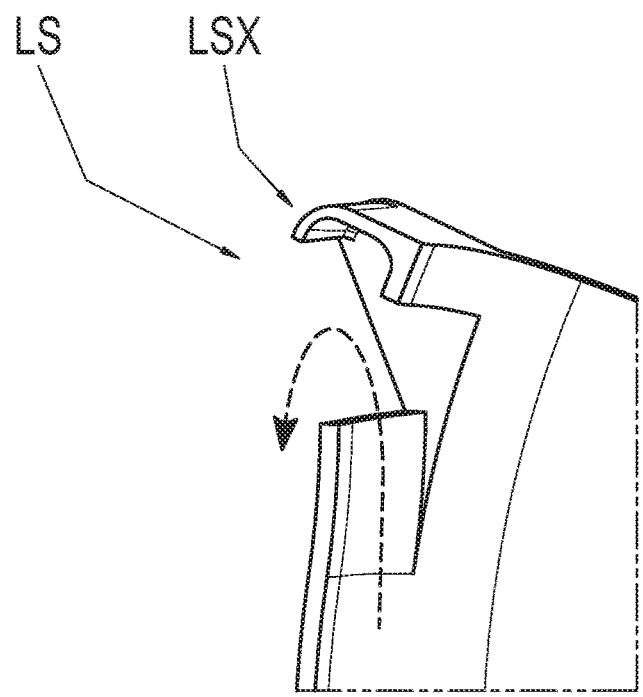

FIG. 6 shows a perspective view of the oil guide shell LS. The oil guide shell LS can be designed, for example, as a plastic shell, and includes three attachment points LSB for screwing to the housing GG. A cover element LSA, which is utilized for covering the gearwheel PX, is provided at the section LS1 of the oil guide shell LS. A scraper edge LSX is formed at the second section LS2 of the oil guide shell LS. Due to the rotation of the torque converter housing TCG (not represented in FIG. 6), oil in the gap C is moved in the direction of the scraper edge LSX. The oil bounces off the scraper edge LSX and flows along the outer side of the oil guide shell LS back into the oil sump SU. This process is represented in greater detail in FIG. 7.

Figure 8:
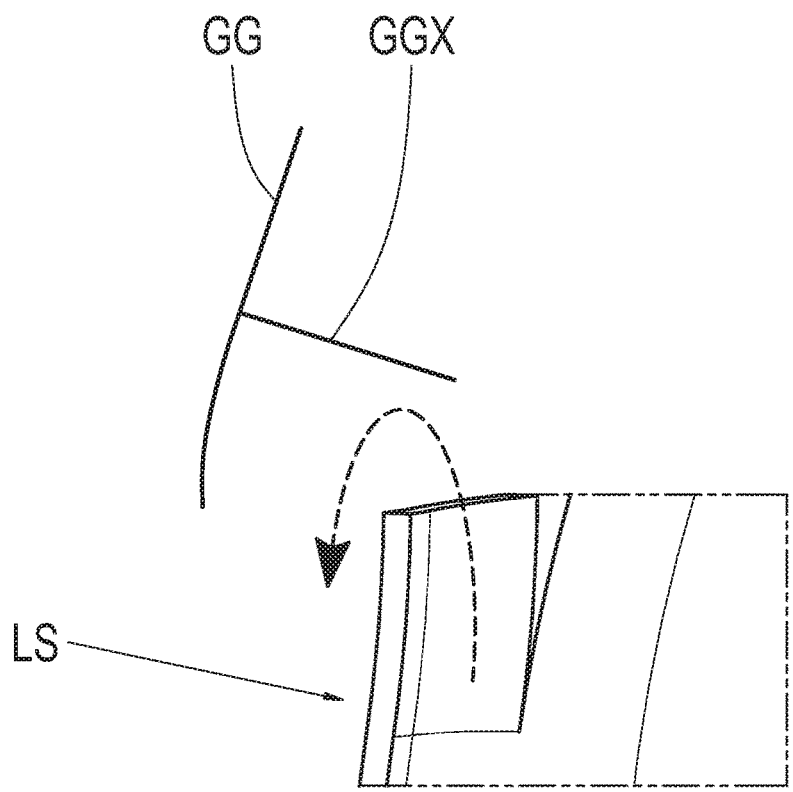

FIG. 8 shows an alternative embodiment of the oil guide shell LS without an integrally formed scraper edge. Instead, a scraper edge GGX formed at the housing GG is provided. The scraper edge GGX could also be attached at the housing GG.

Figure 9:
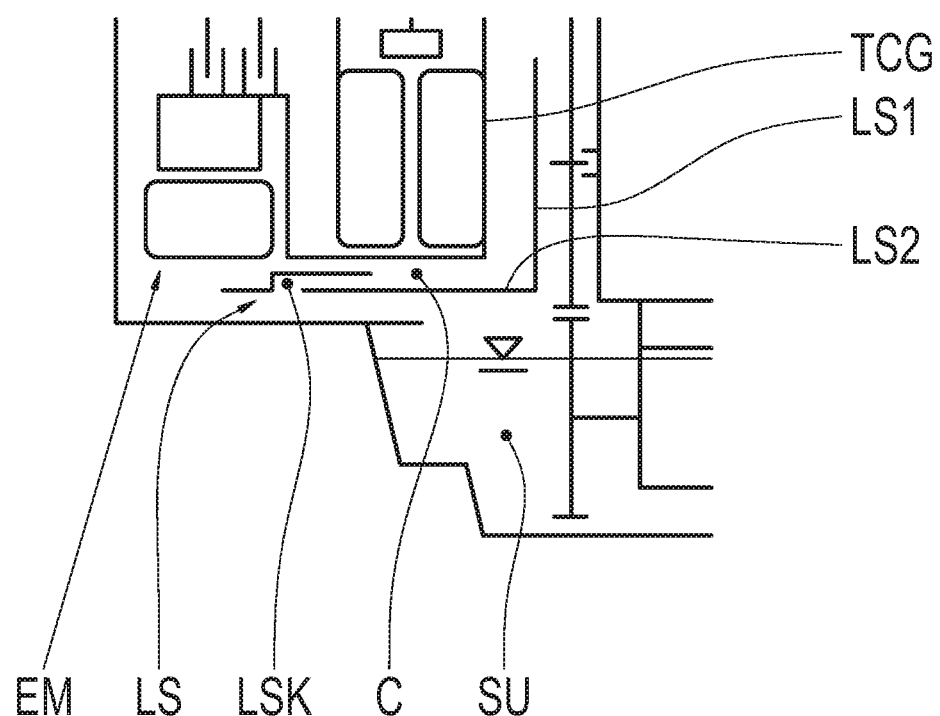
FIG. 9 shows a section of a diagrammatic sectional view of the example hybrid drive unit.

FIG. 9 shows a section of the transmission G represented in FIG. 3a including one further design option of the oil guide shell LS. Reference is made to the reference signs according to FIG. 3a. The oil guide shell LS now includes a drainage duct LSK, through which oil can flow out of the gap C toward the oil sump SU. Such a drainage duct LSK may be provided in addition or as an alternative to the scraper edge LSX/GGX.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE SIGNS

VM internal combustion engine
HY hybrid module
G transmission
AN connection shaft
GG housing
GGX scraper edge
AG differential gear
DW driving wheel
EM electric machine ST stator
RO rotor
KV cooling device
KF cooling oil
TC torque converter
TCG torque converter housing
TC1 first face end of the torque converter housing
TC2 second face end of the torque converter housing
TR turbine wheel
PR impeller
LR stator
F freewheel unit
WK torque converter lockup clutch
RS transmission gear set
GW1 input shaft
GW2 output shaft
HCU hydraulic control unit
P oil pump
SU oil sump
PX, PX2 drive elements of the oil pump
KO separating clutch
NR wet space
LS oil guide shell
LS1 first section of the oil guide shell
LS2 second section of the oil guide shell
LSB attachment points
LSA cover element
LSX scraper edge
LSK drainage duct

The invention claimed is:

1. A hybrid drive unit (HY, G) for a motor vehicle, comprising:
 a housing (GG);
 a torque converter (TC) accommodated in the housing (GG);
 an electric machine (EM) accommodated in the housing (GG); and
 an oil guide shell (LS) partially encompassing a section of the torque converter (TC),
 wherein the electric machine (EM) and the torque converter (TC) are arranged directly next to each other in a common wet space (NR) such that the electric machine (EM) is arranged at a first face end (TC1) of a housing (TCG) of the torque converter (TC),
 wherein a rotor (RO) of the electric machine (EM) is connected to the housing (TCG) of the torque converter (TC), and
 wherein the oil guide shell (LS) has an L-shaped cross-section that comprises a first section (LS1) and a second section (LS2), and the oil guide shell (LS) is arranged such that the first section (LS1) partially encompasses a second face end (TC2) of the torque converter housing (TCG) and the second section (LS2) partially encompasses a circumferential surface of the torque converter housing (TCG).

2. The hybrid drive unit (HY, G) of claim 1, wherein the oil guide shell (LS) is arranged such the second section (LS2) of the oil guide shell (LS) partially encompasses a circumferential surface of the electric machine (EM).

3. The hybrid drive unit (HY, G) of claim 2, wherein the rotor (RO) is arranged radially within a stator (ST) of the electric machine (EM), and the circumferential surface of the electric machine (EM) that is encompassed by the oil guide shell (LS) is formed by a section of the stator (ST).

4. The hybrid drive unit (HY, G) of claim 1, wherein the electric machine (EM) is coolable via a supply of cooling oil (KF), and the oil guide shell (LS) is configured and arranged such a portion of the cooling oil (KF) flowing off the electric machine (EM) is collected at an inner surface of the oil guide shell (LS).

5. The hybrid drive unit (HY, G) of claim 4, wherein the oil guide shell (LS) is arranged such the second section (LS2) of the oil guide shell (LS) partially encompasses a circumferential surface of the electric machine (EM), the oil guide shell (LS) encompasses only a portion of an axial extension of the electric machine (EM), and the oil guide shell (LS) is configured and arranged such that the cooling oil (KF) flowing off the electric machine (EM) is only partly collected at the inner surface of the oil guide shell (LS).

6. The hybrid drive unit (HY, G) of claim 4, wherein the oil guide shell (LS) and the housing (GG) of the hybrid drive unit (HY, G) are configured and arranged such that the portion of the cooling oil (KF) flowing off the electric machine (EM) that is not collected at the inner surface of the oil guide shell (LS) is guided spatially underneath the oil guide shell (LS) to an oil sump (SU) of the hybrid drive unit (HY, G).

7. The hybrid drive unit (HY, G) of claim 4, wherein a gap (C) is formed between the inner surface of the oil guide shell (LS) and the housing (TCG) of the torque converter (TC), and the oil guide shell (LS) is arranged in such that collected cooling oil (KF) is flowable into the gap (C).

8. The hybrid drive unit (HY, G) of claim 7, further comprising means (LS-X, GG-X, LS-K) for carrying away cooling oil (KF) present in the gap (C).

9. The hybrid drive unit (HY, G) of claim 8, wherein the at least one means comprises a scraper edge (LSX) formed at the oil guide shell (LS).

10. The hybrid drive unit (HY, G) of claim 8, wherein the at least one means comprises a scraper edge (LSX) formed or attached at the housing (GG) of the hybrid drive unit (HY, G).

11. The hybrid drive unit (HY, G) of claim 8, wherein the at least one means comprises a drainage duct (LSK) of the oil guide shell (LS).

12. The hybrid drive unit (HY, G) of claim 1, wherein the oil guide shell (LS) is rotationally fixed to the housing (GG).

13. The hybrid drive unit (HY, G) of claim 1, wherein the oil guide shell (LS) comprises a cover element (LSA) that partially covers a drive element (PX) of an oil pump (P) of the hybrid drive unit (HY, G).

14. The hybrid drive unit (HY, G) of claim 1, wherein the oil guide shell (LS) is arranged such that an oil level in the hybrid drive unit (HY, G) is situated higher than a lowermost point of the oil guide shell (LS) in a horizontally aligned installation position of the hybrid drive unit (HY, G).

15. The hybrid drive unit (HY, G) of claim 1, wherein the hybrid drive unit is formed by a transmission (G) or by a hybrid module (HY).

16. A drive train for a motor vehicle, comprising the hybrid drive unit (HY, G) of claim 1.

* * * * *